(12) United States Patent
Maillet et al.

(10) Patent No.: US 9,614,609 B2
(45) Date of Patent: Apr. 4, 2017

(54) SATELLITE-BASED EMISSION AND RECEPTION DEVICE WITH HIGH MULTI-PATH ATTENUATION RATE, REPEATER AND SATELLITE WHICH ARE EQUIPPED WITH SUCH A DEVICE

(71) Applicant: THALES, Neuilly-sur-Seine (FR)

(72) Inventors: Olivier Maillet, Toulouse (FR); Adrien Maffert, Toulouse (FR); Rudy Cachera, Toulouse (FR); Nicolas Cartier, Toulouse (FR)

(73) Assignee: Thales, Courbevoie (FR)

( * ) Notice: Subject to any disclaimer, the term of this patent is extended or adjusted under 35 U.S.C. 154(b) by 106 days.

(21) Appl. No.: 14/550,853

(22) Filed: Nov. 21, 2014

(65) Prior Publication Data

US 2015/0146610 A1  May 28, 2015

(30) Foreign Application Priority Data

Nov. 22, 2013  (FR) ...................................... 13 02692

(51) Int. Cl.
*H04B 7/185*  (2006.01)
*H04B 1/00*  (2006.01)

(52) U.S. Cl.
CPC ....... *H04B 7/18515* (2013.01); *H04B 1/0057* (2013.01)

(58) Field of Classification Search
CPC .......................... H04B 1/0057; H04B 7/18515
See application file for complete search history.

(56) References Cited

U.S. PATENT DOCUMENTS

| 4,479,255 A | 10/1984 | Geesen et al. | |
|---|---|---|---|
| 2003/0008630 A1* | 1/2003 | Ohtaki | H04B 7/084 455/323 |
| 2011/0317620 A1* | 12/2011 | Voisin | H04B 7/2041 370/316 |

FOREIGN PATENT DOCUMENTS

| EP | 2337238 A1 | 6/2011 |
|---|---|---|
| EP | 2654219 A2 | 10/2013 |

* cited by examiner

*Primary Examiner* — Siming Liu
(74) *Attorney, Agent, or Firm* — Baker Hostetler LLP

(57) ABSTRACT

A satellite-based emission and reception device, intended to receive and to process radiofrequency signals originating from an uplink and then to emit the processed signals on a downlink towards terrestrial users, comprises a power divider, two independent frequency converters and two input demultiplexers connected respectively at the output of the two corresponding frequency converters, each frequency converter being controlled by a dedicated local oscillator, the two local oscillators operating at one and the same frequency, the two input demultiplexers comprising channel filters operating in different, disjoint frequency sub-bands spaced apart in frequency, two adjacent frequency sub-bands being filtered by two channel filters belonging to different input demultiplexers.

7 Claims, 4 Drawing Sheets

SATELLITE-BASED EMISSION AND RECEPTION DEVICE WITH HIGH MULTI-PATH ATTENUATION RATE, REPEATER AND SATELLITE WHICH ARE EQUIPPED WITH SUCH A DEVICE

CROSS-REFERENCE TO RELATED APPLICATION

This application claims priority to foreign French patent application No. FR 1302692, filed on Nov. 22, 2013, the disclosure of which is incorporated by reference in its entirety.

FIELD OF THE INVENTION

The present invention relates to a satellite-based emission and reception device with high multi-path attenuation rate, a repeater and a satellite which are equipped with such a device. It applies particularly to the field of satellite telecommunications.

BACKGROUND

The repeaters mounted aboard known communication satellites comprise emission and reception systems which rely on transparent architectures offering uplinks between at least one terrestrial station and the repeater and downlinks between the repeater and a plurality of users. The emission and reception systems can cover a terrestrial geographical zone of coverage by means of a lone beam forming a single ground spot or by means of several beams forming multiple ground spots.

FIGS. 1a and 1b show two examples of architecture of a contemporary payload emission and reception system offering uplinks and downlinks, respectively with single-spot coverage and with multi-spot coverage. The repeater comprises a signal receiver 10 intended to receive radiofrequency signals 40 originating from an uplink, such as for example a terrestrial station. The radiofrequency signals emitted by a terrestrial station generally occupy a broad frequency band. In the signal receiver 10, the broadband signals 40 received are frequency transposed by a frequency converter so as to pass from the reception frequency band to the emission frequency band dedicated to the users. The frequency converter is controlled by a local oscillator OL, the local oscillator being able to operate at a predetermined fixed frequency or at a frequency modifiable by remote control. After frequency conversion, the frequency-transposed broadband signal is thereafter transmitted to an input demultiplexer IMUX 11 which splits and filters the broadband signal into several different frequency sub-bands. Each frequency sub-band, also called a channel, is thereafter amplified by a dedicated power amplifier 12 before being retransmitted to the terrestrial users. In an architecture with single-spot coverage such as represented in the example of FIG. 1a, the signals conveyed in the various channels 1, 2, 3, 4 are recombined in an output multiplexer OMUX 13 to form a single pathway before being emitted towards the users, by a single emission antenna source, not represented. In a multi-spot architecture such as represented in FIG. 1b, the signals conveyed in the various channels are emitted in the form of mutually independent beams by emission sources 14 of an emission antenna, the signals emitted in two adjacent beams 15, 16 being able to recombine, in an overlap zone, not represented, while they are being radiated. The emission antenna which ensures the multibeam coverage can be of the one source per beam type or of the multi-source per beam type. In the case of an antenna of multi-source per beam type, a beamforming array is used.

These two architectures exhibit a significant problem due to the fact that the filters 9 of the input demultiplexer 11 which ensure the filtering of the various frequency sub-bands 1 to 4 are not perfect and allow through, in each channel, spurious frequencies belonging to the sub-bands allotted to the adjacent channels. Each channel therefore transports a main signal 18 whose frequency lies in the frequency sub-band dedicated to the corresponding channel and spurious signals 19 whose frequencies are situated in the adjacent frequency sub-bands. The various channels then form various possible paths for the signals received in the various filtered frequency sub-bands. The signals of the same frequency that are conveyed in two different adjacent transponders and which have therefore followed different paths have different amplitude and phase levels but are mutually coherent. During recombination of the signals arising from the various channels, in the output multiplexer or by radiation, the main signals and the spurious signals of the same frequency arising from adjacent channels then recombine with one another in a coherent manner, thereby modifying the gain and the variation of the delay law and impairing the quality of the link. The contribution of the spurious signals, that have followed different paths from the main path, to the amplitude and to the phase of the radiated signal are conventionally called multi-path effects.

To solve this problem, in the case where the signals are recombined by an output multiplexer, the frequency bands of two adjacent filters are generally separated by a guard band, thereby making it possible to guarantee good frequency isolation between two adjacent channels and to decrease the effects of the multi-paths. However, this solution exhibits the drawback of decreasing the width of the frequency band that can be used for the signals to be transmitted.

In the case of multi-spot coverage where the signals of the same frequency can recombine by radiation, the beams radiated by the emission sources of each channel are generally isolated spatially from one another to ensure sufficient spatial isolation between two beams. This solution imposes significant frequency allocation constraints on the adjacent beams and is very constraining in respect of the dimensioning of the repeater.

SUMMARY OF THE INVENTION

The aim of the invention is to remedy the drawbacks of the known solutions and to produce a satellite-based emission and reception device with high multi-path attenuation rate, making it possible to minimize the guard band between the frequency bands allocated to two adjacent channels and making it possible to reduce the repeater dimensioning constraints that are due to multi-paths.

Accordingly, the invention relates to a satellite-based emission and reception device with high multi-path attenuation rate, said device being intended to receive and to process radiofrequency signals originating from an uplink and then to emit the processed signals on a downlink towards terrestrial users, said device comprising, on reception, a power divider comprising two outputs respectively connected to two independent frequency converters and two input demultiplexers connected respectively at the output of the two corresponding frequency converters, each frequency converter being controlled by a dedicated local oscillator, the two local oscillators operating at one and the same frequency, the two input demultiplexers comprising channel filters operating in different, disjoint frequency sub-bands spaced apart in frequency, two adjacent frequency sub-bands being filtered by two channel filters belonging to different input demultiplexers.

Advantageously, the frequency sub-bands of the filters of the second input demultiplexer are shifted in frequency with respect to the frequency sub-bands of the filters of the first input demultiplexer, the shift in frequency being equal to at least one frequency sub-band width.

The invention also relates to a repeater comprising such an emission and reception device and to a satellite comprising such a repeater.

BRIEF DESCRIPTION OF THE DRAWINGS

Other particular features and advantages of the invention will become clearly apparent in the subsequent description given by way of purely illustrative and nonlimiting example, with reference to the appended schematic drawings which represent.

DETAILED DESCRIPTION

Figure 1A:
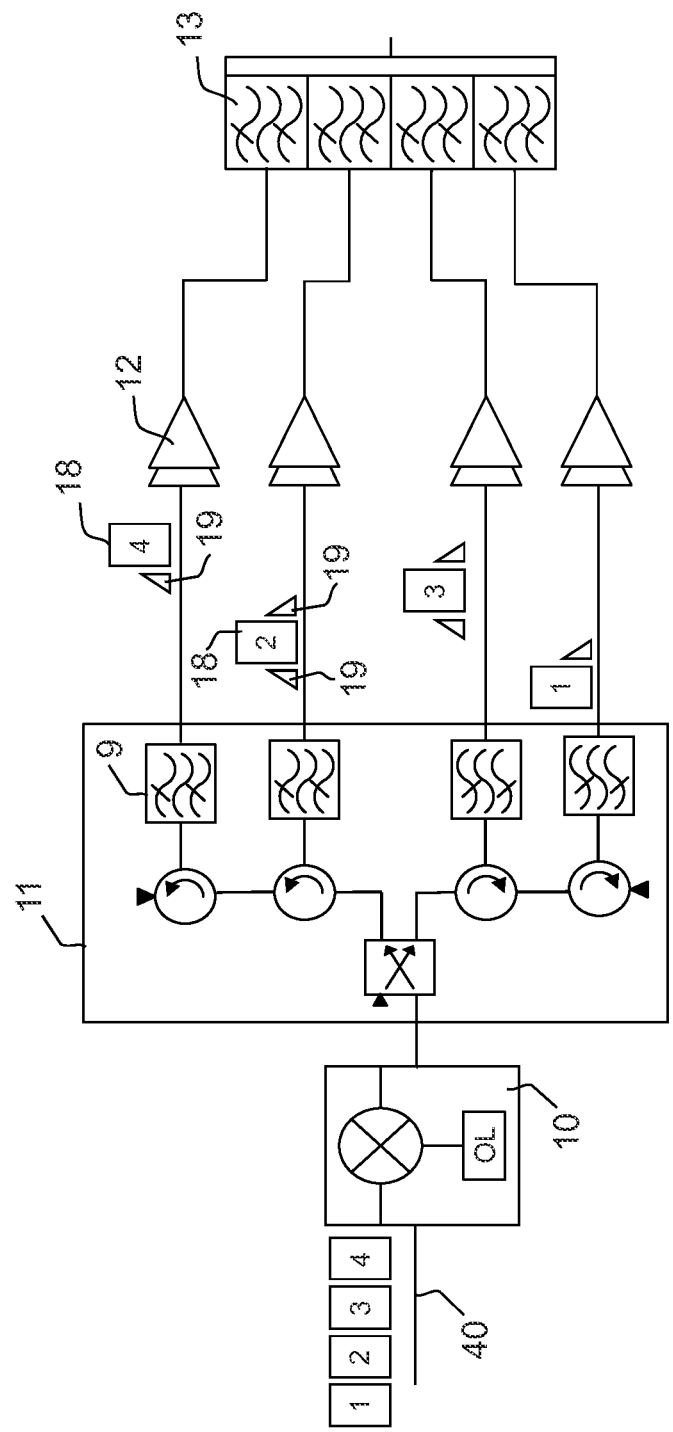
FIGS. 1a and 1b: two examples of architecture of an emission and reception system of a repeater offering uplinks and downlinks, with single-spot coverage and respectively with multi-spot coverage, according to the prior art.
Figure 1B:
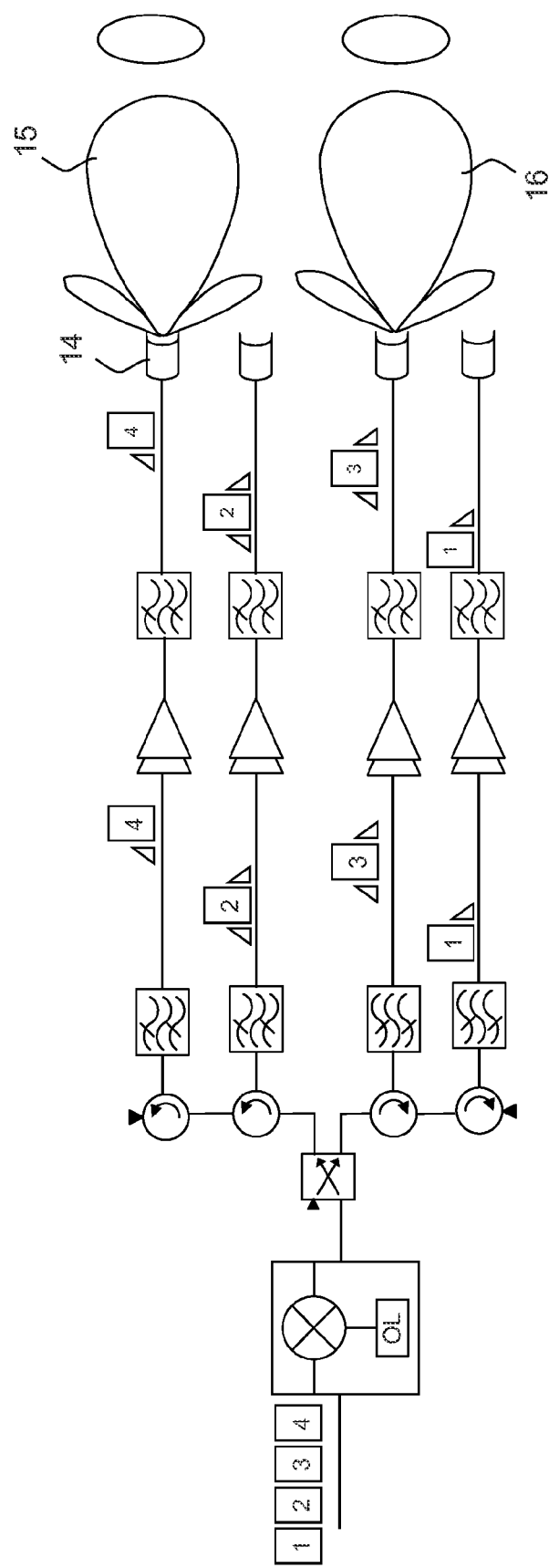
Figure 2A:
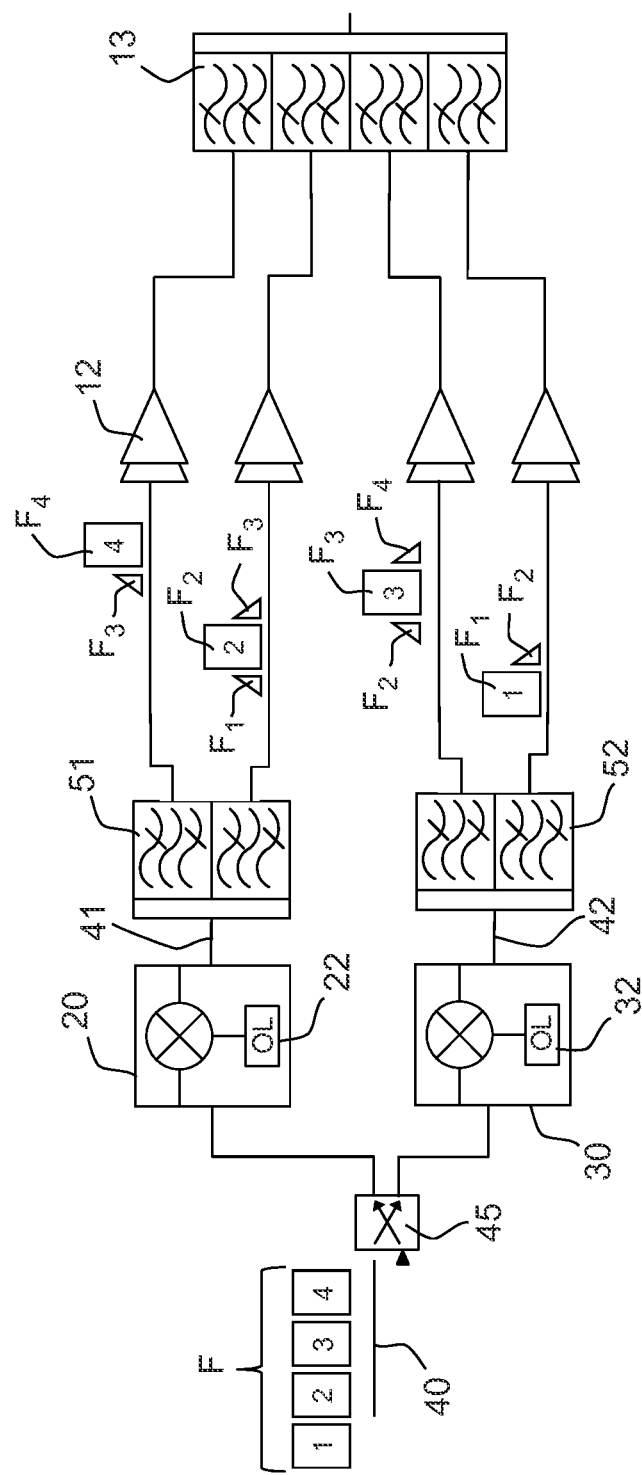
FIGS. 2a and 2b: two examples of architecture of an emission and reception system of a repeater offering uplinks and downlinks, with single-spot coverage and respectively with multi-spot coverage, according to the invention.
Figure 2B:
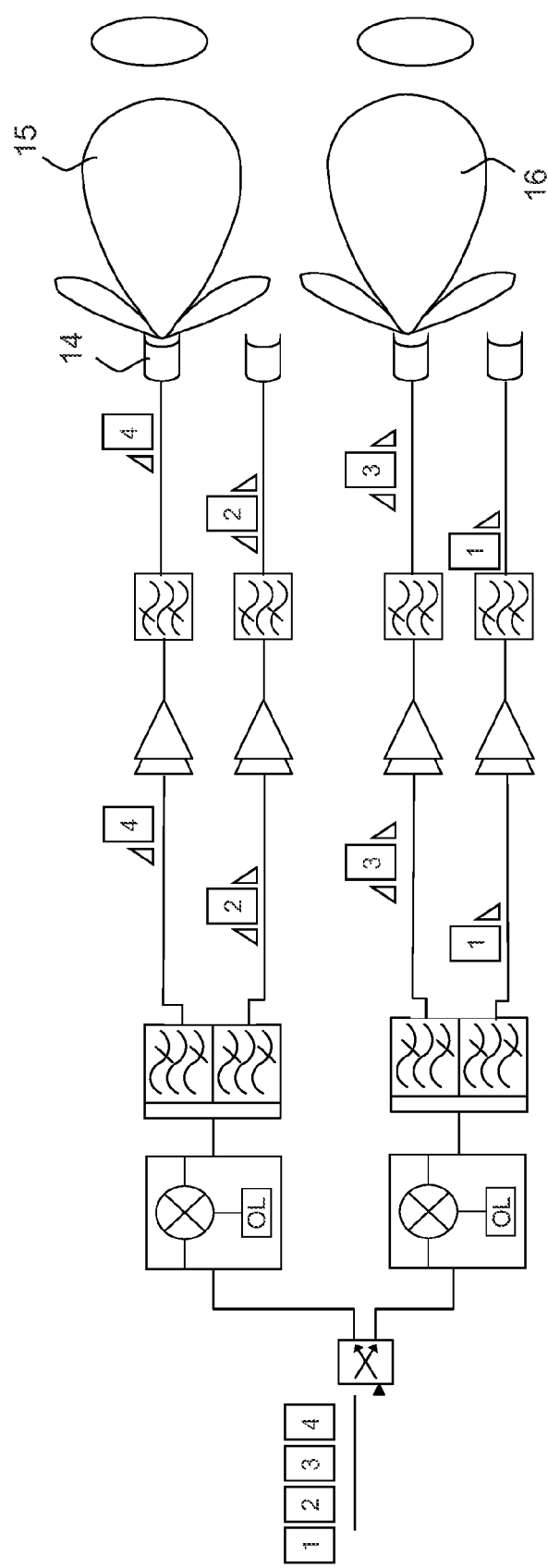

In FIGS. 2a and 2b, in accordance with the invention, the repeater emission and reception system comprises a power divider 45 intended to divide the power of a radiofrequency input signal 40 by two and to apply the two signals arising from the division, respectively as input to two independent frequency converters 20, 30. Each frequency converter 20, 30 is intended to receive and to process in parallel the radiofrequency signals 40, with broad frequency band F, originating from one and the same uplink. The two frequency converters 20, 30 each comprise a local oscillator 22, 32 and can comprise furthermore a low noise input amplifier and an output amplifier, neither represented. Each frequency converter 20, 30 ensures the transposition of the broad frequency band signals 40 received, from the reception frequency band to the emission frequency band dedicated to the users. The local oscillators 22, 32 of the two frequency converters 20, 30 operate on one and the same frequency, the broadband signals 40 are therefore transposed at the same frequency by the two frequency converters 20, 30. As the two frequency converters 20, 30 use different local oscillators 22, 32, they deliver signals having uncorrelated phase noise and uncorrelated phase variations. The relative phases between the signals arising from the two frequency converters 20, 30 therefore vary over time and the signals transposed in frequency by the two frequency converters 20, 30 are not mutually coherent. The output signals 41, 42 of the two frequency converters 20, 30 are therefore identical but are not mutually coherent. After the frequency conversion, the output signal 41 of the first frequency converter 20, respectively the output signal 42 of the second frequency converter 30, is transmitted to a first input demultiplexer 51, respectively to a second input demultiplexer 52, each input demultiplexer 51, 52 being intended to split each respective output signal 41, 42 into several different frequency sub-bands, of the same width, corresponding to different channels. The frequency sub-bands allotted to the channels arising from one and the same demultiplexer are spaced in frequency by a bandwidth greater than or equal to the bandwidth allotted to each channel, the frequency sub-bands filtered by the second demultiplexer 52 being inserted between the frequency sub-bands filtered by the first demultiplexer 51. Thus, two adjacent frequency sub-bands (F1, F2) (F3, F4) are filtered by two channel filters belonging to different input demultiplexers 52, 51. One channel out of two is therefore filtered by the first demultiplexer 51 and one channel out of two is filtered by the second demultiplexer 52.

The various frequency sub-bands are disjoint, that is to say they do not comprise any frequency in common. In FIGS. 2a and 2b, the frequency band F of the signal 40 received by the two receivers 20, 30 is split into two different first frequency sub-bands F2, F4 by the first demultiplexer 51 and into two different second frequency sub-bands F1, F3 by the second demultiplexer 52, the two first and the two second frequency sub-bands forming four different, disjoint frequency sub-bands F1, F2, F3, F4 to which four different channels 1, 2, 3, 4 are respectively allotted. Channels 1 and 3 are allotted to the signals of frequency F1 and F3, separated and filtered by the second demultiplexer 52 and channels 2 and 4 are allotted to the signals of frequency F2 and F4, separated and filtered by the first demultiplexer 51. Only the signals filtered by one and the same demultiplexer are mutually coherent since they originate from one and the same receiver and therefore from one and the same local oscillator. In the examples of FIGS. 2a and 2b, the signals circulating in channels 1 and 3 are mutually coherent and the signals circulating in channels 2 and 4 are mutually coherent, but the signals circulating in channels 2 and 3 and the signals circulating in channels 1 and 4 are not mutually coherent. Because of the imperfection of the four filters intended to filter respectively the four frequency sub-bands F1 to F4, in each channel, there circulate a main signal having a frequency lying in the frequency band allotted to the corresponding channel and spurious signals of lower intensity having frequencies lying in contiguous frequency bands allotted to other channels. The intensity of the spurious signals decreases as their frequency gets further from the frequency band allotted to the channel in which they circulate. Thus, in the examples of FIGS. 2a and 2b, in the first channel 2 there circulate a main signal whose frequency lies in the frequency band F2 allotted to the first channel 2 and spurious signals whose frequencies are situated in frequency bands F1 and F3 allotted respectively to the third and fourth channels 1 and 3. Likewise, in the fourth channel 3 there circulate a main signal whose frequency lies in the frequency band F3 allotted to the fourth channel 3 and spurious signals whose frequencies lie in frequency bands F2 and F4 allotted respectively to the first and second channels 2 and 4. In the third channel 1 there circulate a main signal whose frequency lies in the frequency band F1 allotted to the third channel 1 and spurious signals whose frequencies lie in the frequency band F2 allotted to the first channel 2. In the second channel 4 there circulate a main signal whose frequency lies in the frequency band F4 allotted to the second channel 4 and spurious signals whose frequencies lie in the frequency band F3 allotted to the fourth channel 3. However, as the signals having frequencies lying in adjacent frequency bands are not mutually coherent, the spurious signals circulating in channels which are not dedicated to them are not coherent with the main signals of the same frequency circulating in the channel which is dedicated to them. Thus, in the examples of FIGS. 2a and 2b, the spurious signals having a frequency situated in the frequency band F1 allotted to the third channel 1 but which circulate in the first channel 2 are not coherent with the main signal of the same frequency F1 circulating in the third channel 1. Likewise, the spurious signals having a frequency situated in the frequency band F3 allotted to the fourth channel 3 but which circulate in the first channel 2 and in the second channel 4 are not coherent with the main signal of the same frequency F3 circulating in the fourth channel 3. Likewise, the spurious signals having a frequency situated in the frequency band F2 allotted to the first channel 2 but which circulate in the third channel 1 and in the fourth channel 3 are not coherent with the main signal of the same frequency 2 circulating in the first channel 2. Finally the spurious signals having a frequency situated in the frequency band F4 allotted to the second channel 4 but which circulate in the third channel 3 are not coherent with the main signal of the same frequency F4 circulating in the second channel 4. Consequently, the various spurious signals which circulate in each channel are never coherent with the main signals of the same frequency.

During recombination of the signals originating from the various channels, the spurious signals and the main signals of the same frequency being mutually incoherent, the spurious signals have an effect on the radiated signal comparable to noise, this effect being much weaker and much less destructive than in contemporary emission and reception systems. The effects due to the spurious signals being much weaker, the level of separation between the various channels can be considerably reduced, thereby making it possible to obtain more significant useful bandwidths, and the performance of the emission and reception system in the useful band is much better than in a conventional architecture.

Although the invention has been described in conjunction with particular embodiments, it is very obvious that it is in no way limited thereto and that it comprises all the technical equivalents of the means described as well as their combinations if the latter enter within the framework of the invention.

The invention claimed is:

1. A satellite-based emission and reception device with high multi-path attenuation rate, said reception device configured to:
   receive and to process radiofrequency signals originating from an uplink; and
   emit the processed signals on a downlink towards terrestrial users, said reception device comprising:
      a power divider comprising two outputs, each output respectively connected to one of two independent frequency converters; and
      two input demultiplexers, each input demultiplexer connected respectively at an output of one of the two independent frequency converters, wherein:
         each independent frequency converter is controlled by a dedicated local oscillator,
         the two dedicated local oscillators are configured to operate at a same frequency,
         the two input demultiplexers comprise channel filters operating in different, disjointed frequency sub-bands spaced apart in frequency, and
         two adjacent frequency sub-bands are in different channels filtered by two channel filters belonging to different input demultiplexers.

2. The emission and reception device according to claim 1, wherein the frequency sub-bands of the filters of one of the two input demultiplexer are shifted in frequency with respect to the frequency sub-bands of the filters of the other input demultiplexer, the shift in frequency being equal to at least one frequency sub-band width.

3. A repeater comprising an emission and reception device according to claim 2.

4. A satellite comprising a repeater according to claim 3.

5. A repeater comprising an emission and reception device according to claim 1.

6. A satellite comprising a repeater according to claim 5.

7. A satellite-based emission and reception device with high multi-path attenuation rate, said reception device configured to:
   receive and to process radiofrequency signals originating from an uplink; and
   emit the processed signals on a downlink towards terrestrial users, said reception device comprising:
      a power divider comprising two outputs, each output respectively connected to one of two independent frequency converters; and
      two input demultiplexers, each input demultiplexer connected respectively at an output of one of the two independent frequency converters, wherein:
         each independent frequency converter is controlled by a dedicated local oscillator,
         the two dedicated local oscillators are configured to operate at a same frequency,
         the two input demultiplexers comprise channel filters operating in different, disjointed frequency sub-bands spaced apart in frequency, and
         adjacent frequency sub-bands are in different channels filtered by channel filters belonging to different input demultiplexers.

* * * * *